Jan. 2, 1968

M. L. FALLON 3,361,008

HYDRAULICALLY RESTRICTED DIFFERENTIAL

Filed Dec. 4, 1964

*INVENTOR.*
MICHAEL L. FALLON

BY Richard W. Treverton

ATTORNEY

United States Patent Office 3,361,008
Patented Jan. 2, 1968

3,361,008
HYDRAULICALLY RESTRICTED DIFFERENTIAL
Michael L. Fallon, Pittsford, N.Y., assignor to The Gleason Works, Rochester, N.Y., a corporation of New York
Filed Dec. 4, 1964, Ser. No. 416,062
17 Claims. (Cl. 74—711)

ABSTRACT OF THE DISCLOSURE

Automobile differential mechanism in which an annular piston coaxial of the side gears applies pressure axially against them to brake their rotation relative to the differential gear case, fluid pressure being applied to the annular piston by pumps whose pistons are reciprocated in the case by cams integral with the differential pinions, and the pressure fluid being lubricant directed from the interior of the case to the pump inlets by centrifugal action, and being directed into the case from the axle housing by a collector in the housing which receives lubricant thrown centrifugally from the case.

The present invention relates to an hydraulically restricted differential, especially for automobiles, trucks and like vehicles.

The primary objective is a simple, compact and inexpensive mechanism of this kind which will impose little restriction on free differential action while vehicle has normal road traction, but will provide substantial restriction to such action whenever one drive wheel loses traction.

A differential according to the invention comprises a case containing a pair of side gears and at least one pinion meshing with both side gears, a separating block between the side gears for transmitting axial loads between them, an annular piston coaxial of the side gears and axially displaceable in the case by hydraulic pressure applied to a space between the case and the piston, to exert an axial load on the side gears and thereby impose frictional resistance to their rotation relative to the case, an eccentric co-rotatable with said pinion, a pump piston reciprocable in a cylinder in the case by said eccentric, a valved hydraulic inlet passage into said cylinder and a valved hydraulic outlet passage from said cylinder into said space between the case and the annular piston, and means for relieving pressure from said space.

The foregoing and other objects, advantages and characteristics of the invention will appear from the following description of the preferred embodiment shown in the accompanying drawings, wherein.

Figure 1:
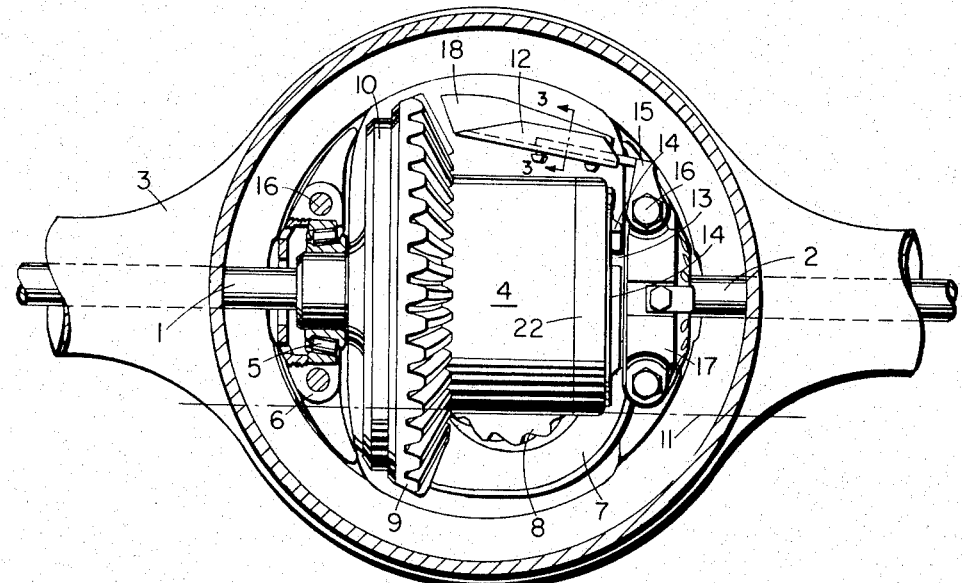
FIG. 1 is a fragmentary vertical sectional view through an automobile rear axle housing.
Figure 2:
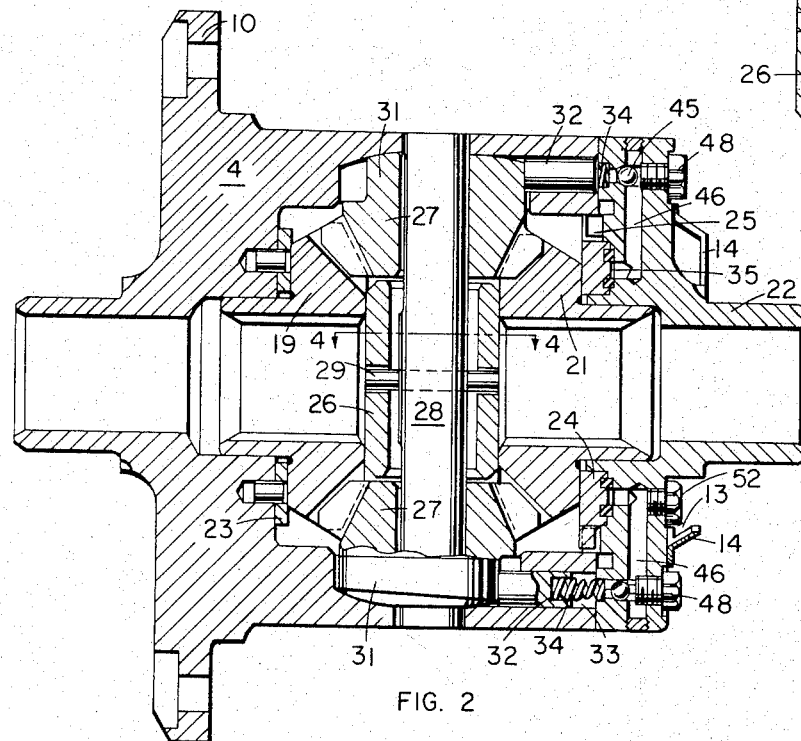
FIG. 2 is an axial section through the differential gear case shown in FIG. 1.
Figure 3:
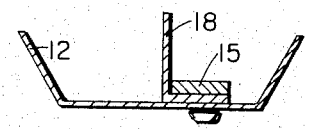
FIG. 3 is a detail sectional view in plane 3—3 of FIG. 1.
Figure 5:
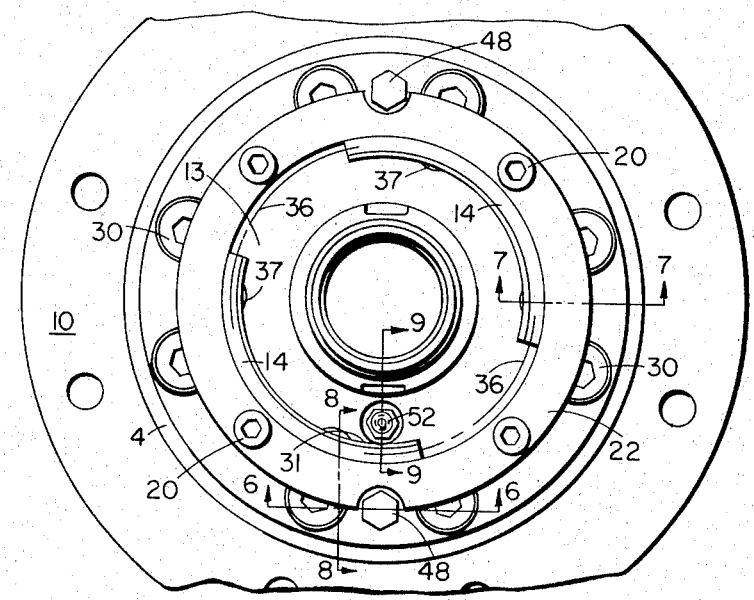
Figure 6:
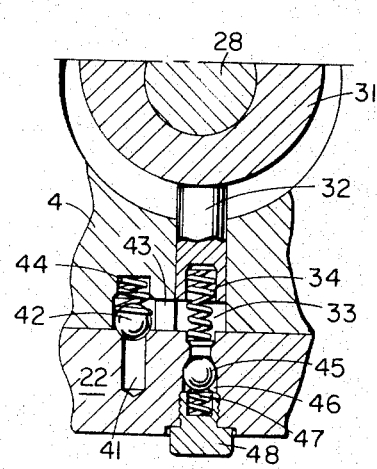
Figure 7:
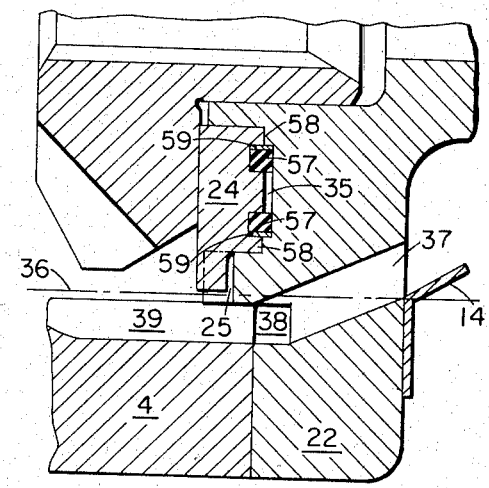
Figure 8:
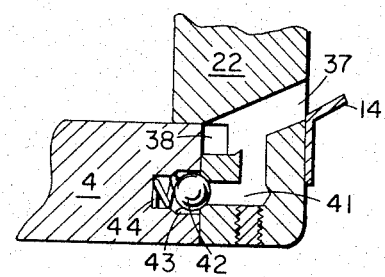
Figure 9:
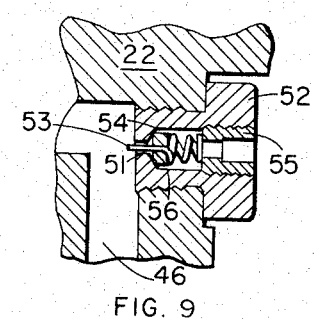

FIG. 5 is an end view of the case, from the right of FIG. 2 and approximately in plane 5—5 of FIG. 1; and, FIGS. 6 to 9 inclusive are detail sectional views in planes 6—6, 7—7, 8—8 and 9—9 of FIG. 3, FIGS. 8 and 9 being on a larger scale than the others.

The automobile rear axle assembly shown in FIG. 1 comprises axle shafts 1 and 2 rotatable in axle housing 3 and having their inner ends extending into a differential gear case 4. The outer ends of the shafts are connected to the drive wheels of the automobile, not shown.

Case 4 is rotatable on anti-friction bearings 5 in the pedestals 6 of a differential carrier 7 bolted to the axle housing. The carrier journals for rotation on anti-friction bearings a hypoid pinion 8 which is connected to the propeller shaft of the vehicle and meshes with a ring gear 9 bolted onto flange 10 of the case 4, for driving the case. The housing contains lubricant oil, usually to about the level indicated at 11, and upon normal rotation of the assembly 4, 9, in either direction, a quantity of this oil is spun off the gear 9 by centrifugal force. A trough 12 secured to the carrier collects a portion of the spun-off oil and directs it for flow by gravity into an opening 13 between two arcuate collector channels 14 formed as flanges of a ring secured to the right end of the case by screws 20. The trough is supported by a bracket 15 secured to carrier 7 by one of the screws 16 that secures the caps 17 of pedestals 6. An upstanding baffle 18 in the trough aids in the collection of the oil. The collected oil, placed under pressure within case 4, exerts pressure against the differential gears to frictionally brake their action, in a manner explained hereinafter.

The inner ends of axle shafts 1 and 2 are splined to bevel gears 19 and 21, FIG. 2, which constitute the side gears of the differential gear mechanism. These gears have cylindrical hubs rotatable in bores respectively in the main part of case 4 and in the right end cover section 22 of the case which is secured to main section 4 by screws 30. The back faces of the gears bear respectively against a thrust washer 23 pinned to case 4 and against a flanged thrust washer 24 mounted for axial motion in an annular groove in cover 22. Washer 24 constitutes an annular piston for exerting an axial load against gear 21. Slots 25 in the inner face of the cover, radially outward of the washer-receiving groove, receive keying radial projections on the washer 24, holding the washer against turning relative to the case.

Figure 4:
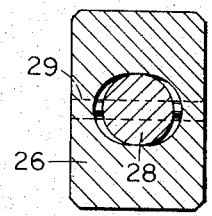
FIG. 4 is a sectional view in plane 4—4 of FIG. 2.

The front faces of the side gears bear against a separator block 26. Two bevel pinions 27, each meshing with both side gears, are rotatable on a pinion shaft 28 that is press-fitted into aligned transverse bores through the case 4. The pinion shaft also extends with substantial clearance through an elongated opening in block 26. As shown in FIG. 4 the pin has a close fit with the block in the plane of rotation of the case 4 but has clearance to permit relative motion of the block along the axis of rotation. A dowel pin 29, extending transversely through the pinion shaft and the block, retains the block centered in the case and out of contact with pinions 72. The end faces of back hubs 31 of the pinions are formed to seat in shallow spherical sockets in the case.

Hubs 31 are cylindrical but eccentric of the pinion shaft, and each of them is adapted upon rotation around shaft 28 to reciprocate a pump piston 32 in a cylinder bore 33 in the outer wall of the case 4, parallel to the axis of rotation of the case. Each pump piston is held against its eccentric 31 by a compression spring 34 whose ends seat in recesses respectively in the piston and in case cover 22. As shown, the two eccentrics 31 are in approximately opposite phase relation to their respective pistons, so that the intake stroke of one piston occurs during the exhaust stroke of the other piston.

The pistons 32 act upon rotation of the differenial gears to pump oil into annular chamber 35 back of annular piston-washer 24, to thereby apply pressure axially against the washer to brake rotation of the differential gears by the frictional engagement of the side gears 19, 21 with the washers 23, 24 and separator block 26. For ensuring a continuous supply of oil to the cylinders 33, the latter are disposed radially outward of the centrifugal level, 36, FIGS. 5 and 7, to which oil is maintained in the interior of the case by the latter's rotation. The case interior thus constitutes a reservoir for supplying oil under pressure to the cylinders 33. Oil inlet passages 37 through case cover 17 incline radially outwards from the bottoms of collector channels 14, as shown in FIGS. 7 and 8, to an annular passage 38 in the cover which opens through grooves 39 into the case interior, so that with continuing flow through trough 12, FIG. 1, into channels 14, oil is maintained in the case to at least the centrifugal or radial level 36 of the bottom portions of the channels 14. Passages 41, FIG. 8, communicate with annular passage 38, and with inclined passages 37, and open through valve seats for ball check valves 42 into passages 43 which lead into the cylinders 33. Each valve 42 is backed by a light spring 44 seated in a shallow bore in case 4, and serves to prevent retrograde flow of oil from the related cylinder 33 into passage 41.

Oil flow from the cylinders 33 is through orifices controlled by ball check valves 45 into passages 46, FIGS. 2, 6 and 9, to chamber 35. Each valve 45 is backed by a light spring 47 which is seated in the bore of a screw plug 48 in case cover 22 and closes the valve to prevent retrograde oil flow into the related cylinder 33. Escape of oil from passages 46 and chamber 35 is through a small bleed opening 51 in a plug 52 in the case cover 22. As shown in FIG. 9, the straight end 53 of a coil spring 54 extends through the opening 51, the spring being held in a counterbore in plug 52 by a tubular retainer 55 that is screw-threaded into plug 52. A washer 56 on the spring end 53 is confined between spring coil 54 and the tapered bottom of the counterbore. The washer backed by spring 54 serves as a valve poppet which reciprocates spring end 53 axially in the bleed opening in response to starting and stopping of oil flow in passage 46, for the purpose of dislodging any solid foreign particles that otherwise might tend to accumulate around and clog the opening 51.

To prevent leakage from chamber 35 around the annular piston-washer 24, inner and outer flexible sealing rings 57, of urethane or other oil resistant rubberlike material, are seated in annular recesses in the washer and in the annular groove in the case cover which constitutes the annular chamber 35. As the washer is moved slightly to the left in FIG. 7 in the presence of oil pressure in this chamber, the abutment faces 58 of the washer and cover separate slightly as clearance between the washers, side gears and separator block is taken up; and to prevent extrusion of the sealing rings into the separation spaces, a split steel ring 59, of about 0.010 inch thickness, is provided around each sealing ring to bridge the separation spaces.

In normal operation of the vehicle in making turns and rounding corners the differential gears rotate at low speeds, so that the volumetric output of the pumps 32, 33, is small and discharges under low pressure through bleed opening 51. The hydraulic pressure acting against the annular piston-washer 24 under this condition is too low to interfere with normal free differential action. However if the drive wheel on either axle shaft 1 or 2 loses traction and spins, causing the differential gears to rotate faster than normally, the output of the pumps increases proportionately. Because of the hydraulic restriction at bleed opening 51, the pressure in chamber 35 increases immediately, imposing a heavy axial load on the washers, side gears and separator block, thereby frictionally restraining differential action and restoring drive torque to the non-slipping wheel. As soon as the slipping wheel regains its traction the rapid pumping action ceases and the bleed opening relieves the pressure in chamber 35, so that the mechanism is automatically freed for normal differential action.

The amount of frictional resistance to differential action under wheel slipping conditions depends upon various factors, especially upon the viscosity of the oil and the size of the bleed opening. The resistance may be varied to suit a vehicle of any particular design, intended use, and oil viscosity, by changing the diameter of the bleed opening 51 of the wire 53.

The resistance may also be increased for a given pressure in chamber 35 by providing additional thrust washers, keyed to the case, between the side gears and washers 23 and 24, with thrust plates, splined to the side gears, disposed between adjacent washers. Such stacks of thrust washers and plates are well known in the art and hence are not illustrated herein.

Having now disclosed the preferred embodiment of my invention, what I claim is:

1. An hydraulically restricted differential comprising a case containing a pair of side gears and at least one pinion meshing with both side gears, a separating block between the side gears for transmitting axial loads between them, an annular piston coaxial of the side gears and axially displaceable in the case, by hydraulic pressure applied to a space between the case and the piston, to exert an axial load on the side gears and thereby impose frictional resistance to their rotation relative to the case, an eccentric co-rotatable with said pinion, a pump piston reciprocable in a cylinder in the case by said eccentric, a valved hydraulic inlet passage into said cylinder and a valved hydraulic outlet passage from said cylinder into said space between the case and the annular piston, and means for relieving pressure from said space.

2. A differential according to claim 1 in which said pressure relieving means comprises a bleed opening.

3. A differential according to claim 1 in which said pump piston is reciprocable in said case in a path substantially parallel to the axis of said side gears.

4. A differential according to claim 1 in which said inlet passage extends from the interior of the case into said cylinder, and there are means for maintaining liquid in the case to a level radially inward of the opening of said passage into said interior of the case, whereby said case constitutes a liquid supply reservoir for said cylinder.

5. A differential according to cliam 1 in which there is a collector on the base for directing liquid into said inlet passage.

6. A differential according to claim 1 in which said annular piston comprises a thrust washer keyed against rotation relative to the case and bearing against the outer face of one side gear to frictionally resist relative rotation thereof.

7. A differential according to claim 6 in which there is another thrust washer held against rotation relative to the case and bearing against the outer face of the other side gear to frictionally resist relative rotation thereof.

8. A differential according to claim 1 having a plurality of such planet gears each having an eccentric co-rotatable therewith, and one pump piston and valved inlet passage and valved outlet passage for each eccentric, said eccentrics being in different phase relation.

9. A differential according to claim 8 in which said plurality of such plant gears comprise two planet gears rotatable on a pinion-support pin which extends through the case, said pin extending through an opening in said separating block and holding the latter against rotation relative to the case about the axis of the side gears.

10. A differential according to claim 9 in which there is a cross-pin extending through said pinion-support pin and into said separating block to retain the latter centered in the case.

11. An hydraulically restricted differential comprising a rotatable case containing a pair of differential side gears and at least one pinion meshing with both side gears, a pump piston reciprocable in a cylinder in the case, a valved inlet passage and a valved outlet passage respectively to and from the cylinder, pressure operated means connected to said outlet passage for resisting rotation of said gears and pinion in the case, said inlet passage extending from the interior of the case, means for maintaining liquid in the case to a centrifugal level radially inward of the opening of said inlet passage into the case interior, whereby said case constitutes a liquid supply reservoir for said cylinder, and said cylinder being radially outward of said opening of the inlet passage into the case interior.

12. A differential according to claim 11 in which said cylinder is radially outward of said opening of the inlet passage into the case interior.

13. A differential of the hydraulically restricted type comprising a rotatable case containing a pair of differential side gears and at least one pinion meshing with both side gears, a pump piston reciprocable in a cylinder in the case, a valved inlet passage and a valved outlet passage respectively to and from the cylinder, pressure operated means connected to said outlet passage for resisting rotation of said gears and pinion in the case, said inlet passage extending from the interior of the case, means for maintaining liquid in the case to a centrifugal level radially inward of the opening of said inlet passage into the case interior, whereby said case constitutes a liquid supply reservoir for said cylinder, said liquid level maintaining means comprising a passage extending through a side wall of the case with its opening into the interior of the case spaced radially outward from its opening at the exterior of the case, and a collector channel on the exterior of said side wall of the case for directing into said passage liquid subjected to centrifugal force by rotation of the case.

14. A differential according to claim 13 rotatable in a liquid-containing housing, in which said collector channel is of arcuate form, being curved about the axis of rotation of the case, a ring gear being secured to the case, and there are means for collecting liquid that is spun off said gear and directing it for flow by gravity into said collector channel.

15. A differential of the hydraulically restricted type comprising a rotatable case containing a pair of differential side gears and at least one pinion meshing with both side gears, a pump piston reciprocable in a cylinder in the case, a valved inlet passage and a valved outlet passage respectively to and from the cylinder, pressure operated means connected to said outlet passage for resisting rotation of said gears and pinion in the case, a bleed opening from said outlet passage, a wire extending through said bleed opening, and a fluid pressure operable means for reciprocating the wire in the opening.

16. A differential according to claim 15 in which said fluid pressure operable means comprise a spring supporting wire for reciprocation and a valve poppet secured to the wire.

17. A differential according to claim 16 in which there is a seat for said valve poppet in a passage communicating with said bleed opening, the poppet being held yieldably against said seat by said spring and being movable away from the seat by fluid discharging through said passage and bleed opening.

References Cited
UNITED STATES PATENTS

| | | | |
|---|---|---|---|
| 2,627,190 | 2/1953 | Bottcher | 74—711 |
| 2,855,805 | 10/1958 | Fallon | 74—711 |
| 3,040,600 | 6/1962 | Mueller | 74—711 |
| 3,145,583 | 8/1964 | Frentzei | 74—711 |
| 3,158,042 | 11/1964 | Saurer | 74—711 |
| 3,230,795 | 1/1966 | Mueller | 74—711 |

FRED C. MATTERN, JR., *Primary Examiner.*

DAVID J. WILLIAMOWSKY, C. J. HUSAR,
*Examiners.*